(12) United States Patent
Viaud

(10) Patent No.: US 7,730,704 B2
(45) Date of Patent: Jun. 8, 2010

(54) AGRICULTURAL PRESS

(75) Inventor: Jean Viaud, Gray (FR)

(73) Assignee: Deere & Company, Moline, IL (US)

( * ) Notice: Subject to any disclaimer, the term of this patent is extended or adjusted under 35 U.S.C. 154(b) by 131 days.

(21) Appl. No.: 11/845,843

(22) Filed: Aug. 28, 2007

(65) Prior Publication Data

US 2008/0141642 A1 Jun. 19, 2008

(30) Foreign Application Priority Data

Dec. 15, 2006 (DE) ........................ 10 2006 059 265

(51) Int. Cl.
*A01D 57/14* (2006.01)
(52) U.S. Cl. ......................................... 56/16.1; 56/364
(58) Field of Classification Search .................. 56/14.4, 56/16.1, 190, 219, 220, 341, 364
See application file for complete search history.

(56) References Cited

U.S. PATENT DOCUMENTS

| 2,362,861 | A | * | 11/1944 | Russell ........................ 100/20 |
| 2,524,233 | A | * | 10/1950 | Russell ........................ 56/364 |
| 3,815,346 | A | * | 6/1974 | Nelson ........................ 56/364 |
| 3,924,391 | A | * | 12/1975 | Cheatum ...................... 56/364 |
| 4,015,410 | A | * | 4/1977 | Smith .......................... 56/364 |
| 4,411,127 | A | * | 10/1983 | Diederich et al. ............. 56/364 |
| 4,495,756 | A | * | 1/1985 | Greiner et al. ................ 56/364 |
| 4,516,389 | A | | 5/1985 | Core |
| 5,224,328 | A | * | 7/1993 | Viaud .......................... 56/341 |
| 5,293,732 | A | * | 3/1994 | Vogelgesang et al. .... 56/16.4 R |
| 5,752,372 | A | * | 5/1998 | Buermann ............... 56/10.2 E |
| 6,295,797 | B1 | * | 10/2001 | Naaktgeboren et al. ....... 56/364 |
| 6,442,918 | B1 | * | 9/2002 | Fox ............................. 56/221 |
| 6,688,092 | B2 | * | 2/2004 | Anstey et al. ................. 56/220 |
| 7,222,479 | B2 | * | 5/2007 | Stahl et al. ................... 56/221 |
| 7,404,284 | B2 | * | 7/2008 | Viaud et al. .................. 56/341 |
| 2007/0119140 | A1 | * | 5/2007 | Gette et al. ................... 56/364 |

FOREIGN PATENT DOCUMENTS

EP 1 252 813 10/2002
GB 2 117 619 10/1983

OTHER PUBLICATIONS

European Search Report, Mar. 28, 2008, 5 pages.

* cited by examiner

*Primary Examiner*—Thomas B Will
*Assistant Examiner*—Mai T Nguyen

(57) ABSTRACT

An agricultural press has material receiver for picking up a swath of crop material from the ground and delivering it to the press chamber. A material hold-down device extends over the material receiver and is mounted for vertical movement relative to the material receiver. During normal operation the hold-down device moves over a first range of movement in response to changing swath thicknesses. If a material jam should nevertheless arise, the material hold-down device can be moved in total or in part, either mechanically or manually, over an second range of movement in addition to the first range of movement in order to be able to liberate the wedged material.

6 Claims, 10 Drawing Sheets

AGRICULTURAL PRESS

FIELD OF THE INVENTION

The invention relates to an agricultural press comprising a material receiver and a material hold-down device, provided above the said material receiver and mounted for vertical movement relative thereto, within a first range of movement, in response to varying thickness of the material mat for controlling the supplied material quantity.

BACKGROUND OF THE INVENTION

U.S. Pat. No. 6,295,797 discloses a round baler comprising two material hold-down devices having resilient tines, of which one downstream-situated tine is held by means of gas accumulators against rapid movements. Both material hold-down devices can move under the pressure of the material until they can no longer move any further. Once this state has arisen, any further supply of material will result in a material jam. This behavior manifests itself equally in respect of all comparable material hold-down devices.

The problem on which the invention is founded can be seen in the fact that, in the case of a material jam resulting in a blockage, the machine is halted and the jam has to be cleared by hand.

SUMMARY OF THE INVENTION

According to the present invention, there is provided an agricultural press equipped with a material receiver having a material hold-down device extending over, and mounted for vertical movement relative to the material receiver within a first range of movement for controlling the supplied material quantity.

An object of the invention, is to provide a material hold-down device, as just stated, which in whole, or in part, can be released for a second range of movement away from the material receiver beyond the first range of movement.

In this way, a regular supply of material certainly continues to be ensured; in addition, if a material jam should nevertheless arise, this can be remedied. Yet the movement within the additional second range of movement cannot take place of its own accord, which might, in fact, produce an even greater jam, but rather a deliberate release is required, which can, however, be realized according to choice, for example, manually, by motorized means, by remote control, etc. This conscious release decision can then also be linked with other operations, for example the switching-off of the drive mechanism, the operation of safety and/or signaling devices, etc. To what extent, where and how the material hold-down device is able to move can be tailored to the prevailing conditions, the only point of importance being that the jammed material can be freed. The material receiver as well as the press can be variously constructed, for example as round, rectangular, or round balers, as tine, belt or other pick-ups.

Whilst a material hold-down device can be configured so as to move through the first and second ranges in its entirety, it is sufficient for a part of it, for example a material-guiding device, to be moveable relative to a remainder of the hold-down device through the second range of movement. A multi-part structure can easily be achieved if a support is provided, which can consist of individual arms, transverse struts, a frame or the like. The feed-in of the material into the region between the material receiver and the material-guiding device is facilitated if a press-down device is provided, which the gathered material first hits and which forces the latter onto the material receiver. On the support there are provided the necessary bearings which enable the vertical movements.

Swaths which vary in thickness can be easily transported, within the normal operation of the hold-down device, if the support, is floatingly mounted for permitting movement within the first range of movement. For the movement over the additional second range of movement, either the support or the material-guiding device can be selectively raised. The floating movement is realized, preferably at least, counter to the resistance of the weight of the material hold-down device or of a spring, possibly even shock absorbers or vibration dampers being able to be used, which prevent uncontrolled movements.

A material-guiding device, which is configured, for example, as a metal plate, a rake or as a plurality of rollers, is capable of bridging a certain distance and thus of preventing an uncontrolled accumulation of material. The design can be chosen according to the material type, rollers, in particular, ensuring a low frictional resistance.

At high receiver speeds, in particular, it is useful to even minimize the friction resulting from a rotating press-down device, since otherwise the material piles up in front of the press-down device. Such a press-down device can even be rotary driven and/or can have axially conveying worm portions.

The movement of the material hold-down device or of the material-guiding device within the first, i.e., the normal working range of movement can be limited in an inexpensive and simple manner, for example by means of a chain, a cable, a long hole, a link, or by means of webs, and can respectively form stops for at least one end of a range of movement.

If the first range of movement is defined for example by an elongate hole that is adjustable, for example by electrical or hydraulic remote-control, a separate adjustment feature for establishing a second range of movement does not necessarily need to be independently provided; rather, the second range of movement can be obtained by a displacement of the first range of movement. Thus, the first and second ranges of movement can be provided by adjusting a structural part by an electric or hydraulic motor, for example.

BRIEF DESCRIPTION OF THE DRAWINGS

Several illustrative embodiments of the invention are represented in greater detail below in the drawing, in which.

DESCRIPTION OF THE PREFERRED EMBODIMENT

Figure 1:
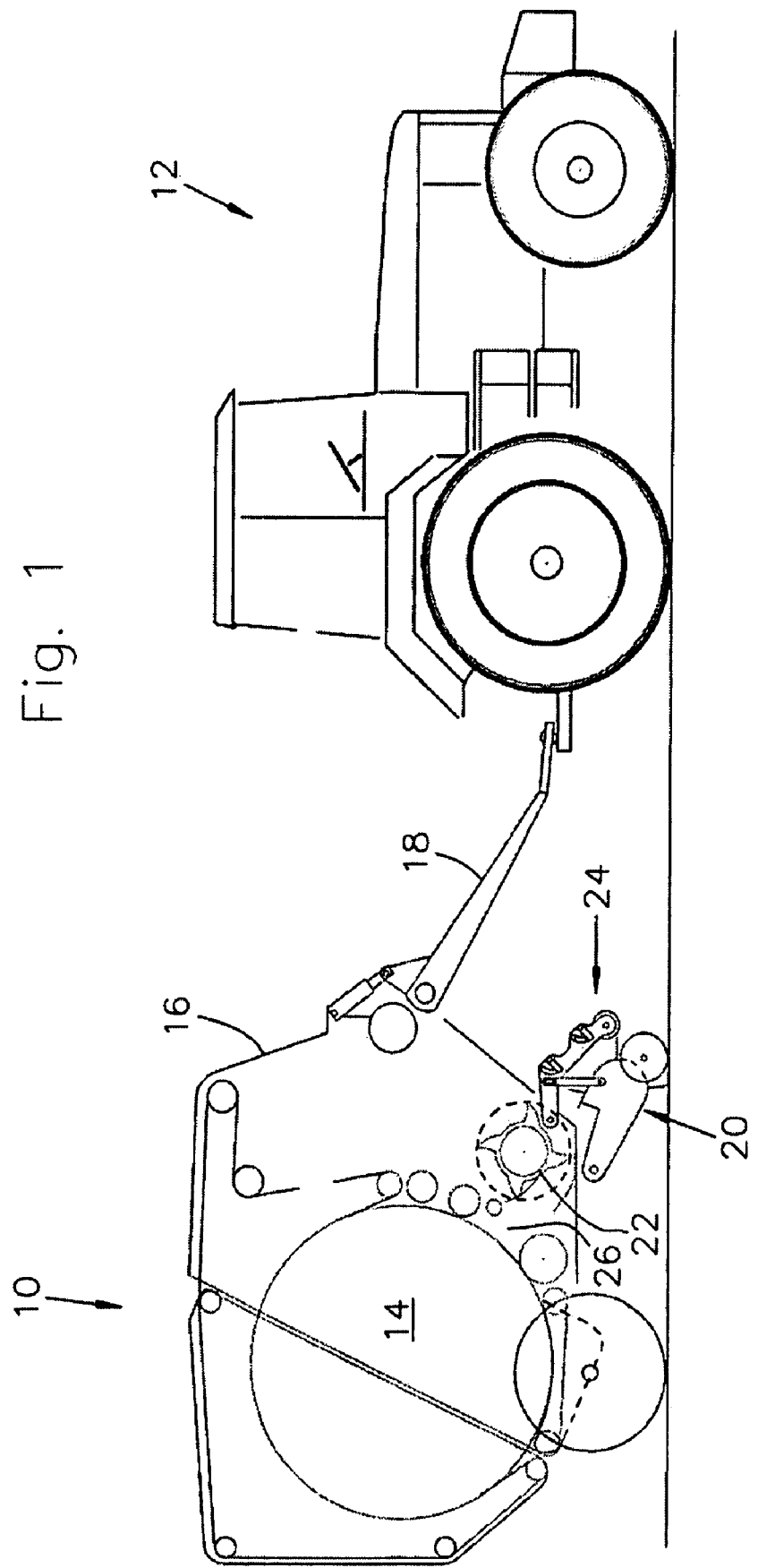
FIG. 1 shows an agricultural press behind a tractor, comprising a material hold-down device according to a first illustrative embodiment.

FIG. 1 shows an agricultural press 10 behind a tractor 12, as they are generally known.

The agricultural press 10 is configured as a round baler with a variable pressing chamber 14; it could also, however, be a different press, a forage harvester, a loader wagon or the like, in which comparable problems arise.

The agricultural press 10 has a frame 16, a drawbar 18, a material receiver 20, a feed rotor 22 and a material hold-down device 24. As is known, the agricultural press 10, by means of the material receiver 20, gathers material from the ground, which is deposited there in swaths and can consist, for example, of hay, straw or silage. There are also industrial applications, in which waste, materials, tobacco, etc. are pressed. During this material reception, problems can arise if the thickness of the swath is uneven.

The pressing chamber 14 is provided in the front lower region with an inlet 26, through which the gathered material is fed in by the material receiver 20 directly or, if present, by the feed rotor 22. The pressing chamber 14 can also be of constant configuration in terms of its size.

The frame 16 is supported on the ground by means of wheels, supports all parts of the agricultural press 10 and is connected by the drawbar 18 to the tractor 12.

The material receiver 20 is normally configured as a so-called pick-up having rotary tines, but can be of any chosen configuration. In any event, the material receiver 20 lifts up the material lying on the ground and conveys it overhead to the inlet 26. The material receiver 20 is supported on the ground by means of wheels and can thus follow the contour of the ground; in this illustrative embodiment, the material receiver 20 can pivot vertically relative to the frame 16.

The feed rotor 22 can be configured as a simple, purely tangentially conveying rotor, as a rotor having additional axial worms, and/or as a rotor forming part of a cutting device, as is respectively known per se. Moreover, the feed rotor 22 can operate as an undershot conveyor, as in the illustrative embodiment, or as an overshot conveyor, its normal direction of rotation being able to be reversed in the event of a material jam. The feed rotor 22 receives the gathered material directly from the material receiver 20 and feeds it through the inlet 26 into the pressing chamber 14.

The material hold-down device 24 is located above the material receiver 20 and, if present, before the feed rotor 22. The function of the hold-down device 24 is to ensure an even material flow into the pressing chamber 14 and, in this invention, to provide a facility for reacting to any material jams which might nevertheless arise.

Figure 2:
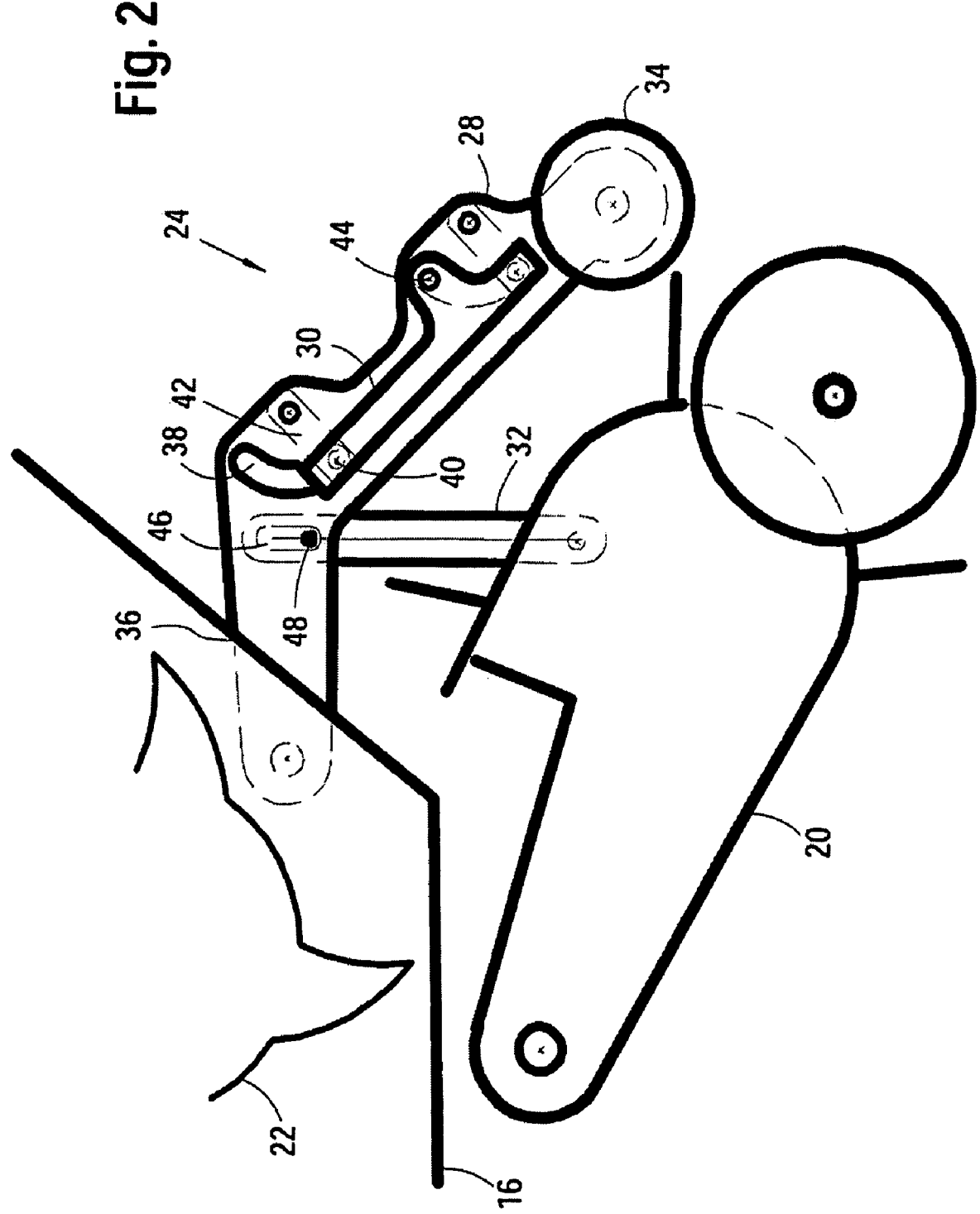
FIG. 2 shows the material hold-down device according to FIG. 1 in an enlarged representation and in a lower work setting of the first range of movement.

For this purpose, the material hold-down device 24, see, in particular, FIG. 2, has a support 28, a material-guiding device 30 and a travel limiter 32, to which in this case there is assigned, an upstream-situated press-down device 34, which is not necessarily required.

The support 28 includes two identical arms 36, respectively one on either side, which arms are angled off at the bottom in the forward direction and, in the rear region, are attached in a vertically pivotable manner to the frame 16, and between which arms the material-guiding device 30 and the press-down device 34 extend. The arms 36 can also be mutually connected by means of struts or the like (in a manner not shown) and can thus form an intrinsically rigid, vertically pivotable unit.

The material-guiding device 30 is, in this case, configured as a simple, smooth plate, which extends over a substantial part of the distance between the press-down device 34 and the feed rotor 22. As is further described with regard to the other figures, the material-guiding device 30 can move vertically through a normal first range of movement, with or without the support 28, relative to the material receiver 20 and can thus adapt to the thickness of the swath; it can also, however, be selectively moved through a second range of movement beyond this normal first range of movement to allow a material jam to be cleared. Instead of being configured as a plate, the material-guiding device 30 can also be configured as a belt, a multiplicity of rollers, as tines or the like. In the illustrative embodiment shown in FIG. 2, the material-guiding device 30 is connected by a parallel linkage defined by front and rear pairs of parallel, swinging brackets 42. with one of each pair being located on opposite sides in a vertically movable manner to the arms 36. In order to control the movement of the material-guiding device 30, slots 38 are provided in the arms 36 and guides 40 are provided at connections of the brackets 42 with the material-guiding device 30, which guides can be moved or halted in the quadrant-shaped slots 38. The material-guiding device 30 is further provided with a locking device 44, which can comprise on it two openings, which can be brought into coincidence, together with the arms 36, and a bolt which can be put through the latter. The distance which can be covered by the material-guiding device 30 after the unlocking hence corresponds to the second range of movement, which serves to relieve the load on any jammed material so as to enable its removal.

Thus the travel limiter 32 and the pairs of swinging brackets 42 together with the guides 40 and slots 38 cooperate to define a travel limiting arrangement. The travel limiter 32 defining a first travel limiting portion of the travel limiting arrangement and the brackets 42. guides 40 and slots 38 defining a second travel limiting portion of the travel limiting arrangement.

In the illustrative embodiment, the travel limiter 32 is configured as a strut, which in its lower end region is connected in a vertically pivotable manner to the material receiver 20 and in its upper or opposite end region has a longitudinal slot 46. The longitudinal slot 46 is penetrated by a bolt 48 located on at least one of the arms 36. The longitudinal slot 46 thus defines the minimum as well as the maximum distance of the material hold-down device 24 from the material receiver 20 and thus delimits the first range of movement, or the normal working range of movement of the hold-down device 24.

The press-down device 34 is in this case configured as a roller, but is not essential to the invention; it could also be configured as a metal plate or the like and helps to introduce the material without disturbance into the gap between the material receiver 20 and the material hold-down device 24. If configured as a roller hold-down device, the press-down device 34 could also be driven and/or equipped with axial guiding elements.

Figure 3:
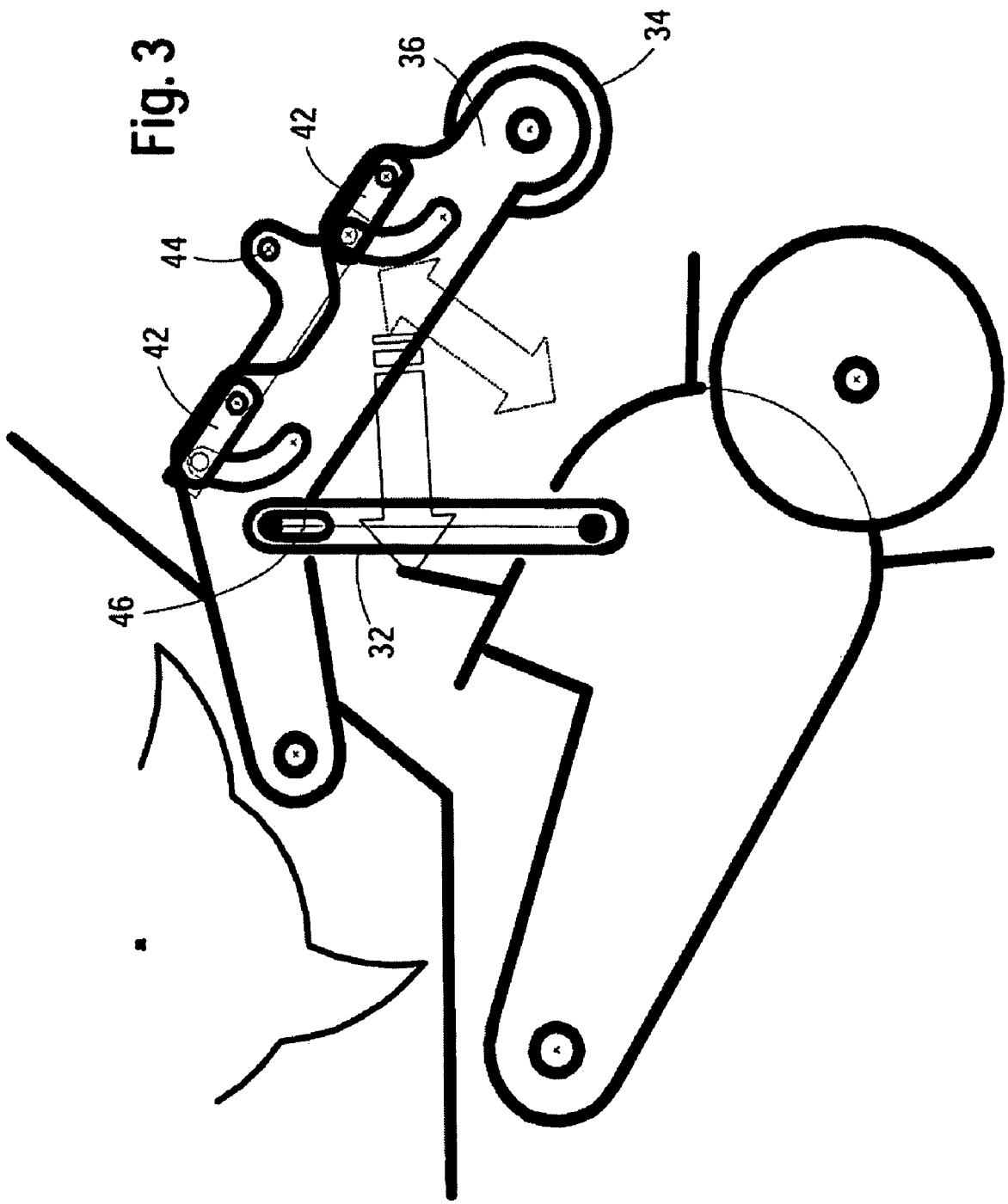
FIG. 3 shows the material hold-down device according to FIG. 1 in enlarged representation and in an upper setting of the second range of movement, in which a material jam can be cleared.

After all this, for the illustrative embodiment according to FIGS. 1 to 3, the following working is obtained.

The material gathered from the ground is conveyed into the region between the material hold-down device 24 and the material receiver 20, whereupon it forms a mat of varying thickness. As long as the thickness of the mat is in the range within which the material hold-down device 24 can move, based on the length of the longitudinal slot 46, the material is conveyed continuously into the inlet 26. If a case should arise in which either too much material has suddenly been gathered or, in the event of reversal, the back-fed material cannot flow off, it is possible for the material to wedge in the region beneath the material hold-down device 24 and to no longer be transportable, either mechanically or manually. In this case, an operator will switch off the drive emanating from the tractor 12, will make his way to the material hold-down device 24 and will unlock the locking device 44, so that the material-guiding device 30 can pivot away upwards with the brackets 42 until the guides 40 butt against upper ends of the slots 38, as shown in FIG. 3. The jammed material can now be pulled out and the operation subsequently resumed.

Figure 4:
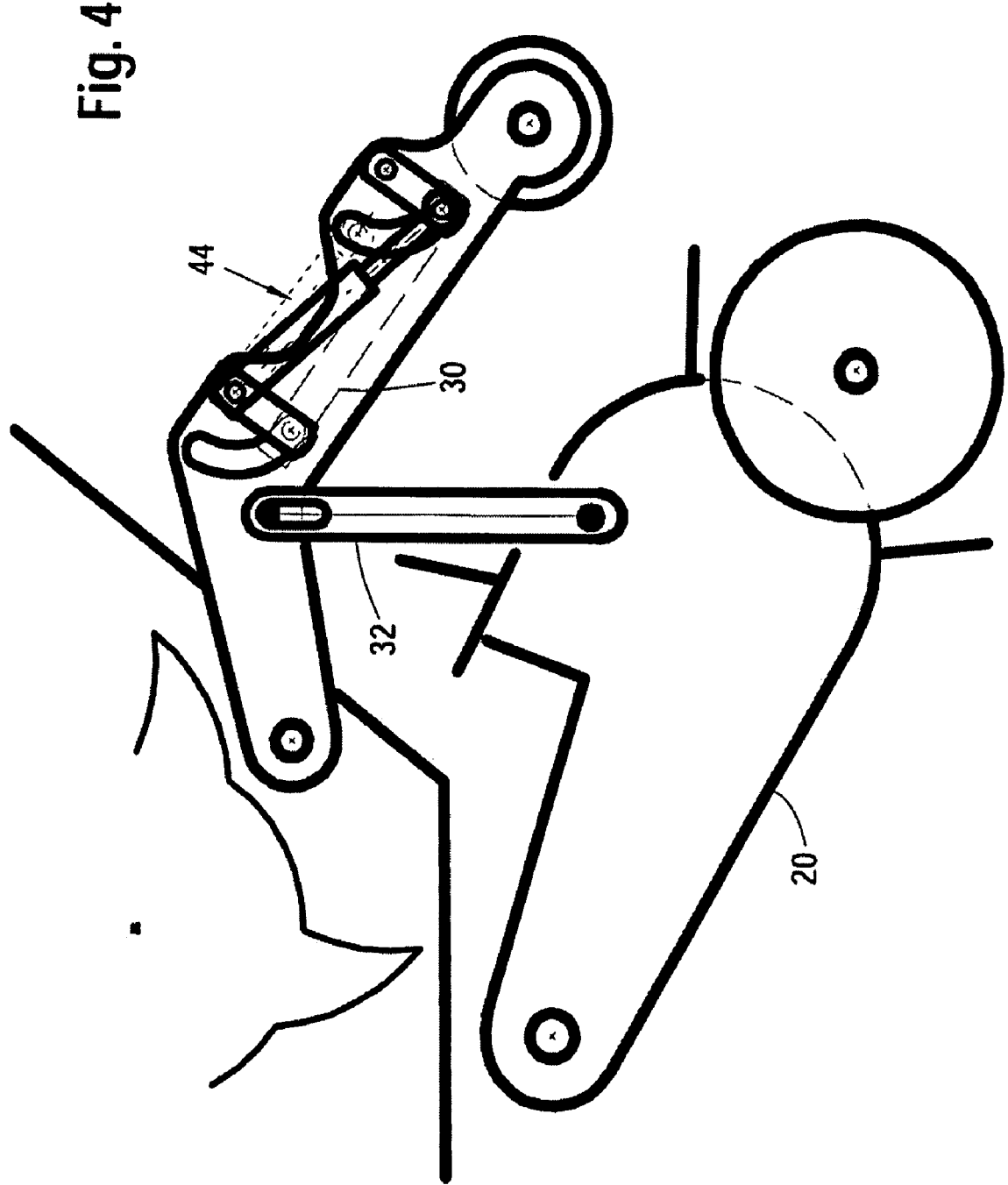
FIG. 4 shows a material hold-down device according to a second illustrative embodiment in which an actuator is provided for moving a crop-engaging part of the hold-down device to an upper setting of the second range of movement, in which a material jam can be cleared.

In the illustrative embodiment according to FIG. 4, the locking device 44 is formed by a motor, which in this case is hydraulically adjustable. Alternatively, an electric or pneumatic motor could also be used. The locking device configured as a motor can, once again in the case of a jam, be actuated such that the material-guiding device 30 moves vertically away from the material receiver 20 through the second range of movement and enlarges the space in between the material-guiding device 30 and the material receiver 20. Finally, the material-guiding device 30 can be adjusted back again by motor-driven means, to be precise respectively without an operator having to disembark from the tractor 12. In a comparable manner, the locking device 44 according to FIGS. 1 to 3 could also be configured so as to be remote-controlled.

In the illustrative embodiments according to FIGS. 5 to 10, the material-guiding device 30 is no longer connected movably to the support 28, but fixedly; it could be bolted on, welded on, etc. The slots 38, the guides 40 and the brackets 42 are consequently dispensed with.

Figure 5:
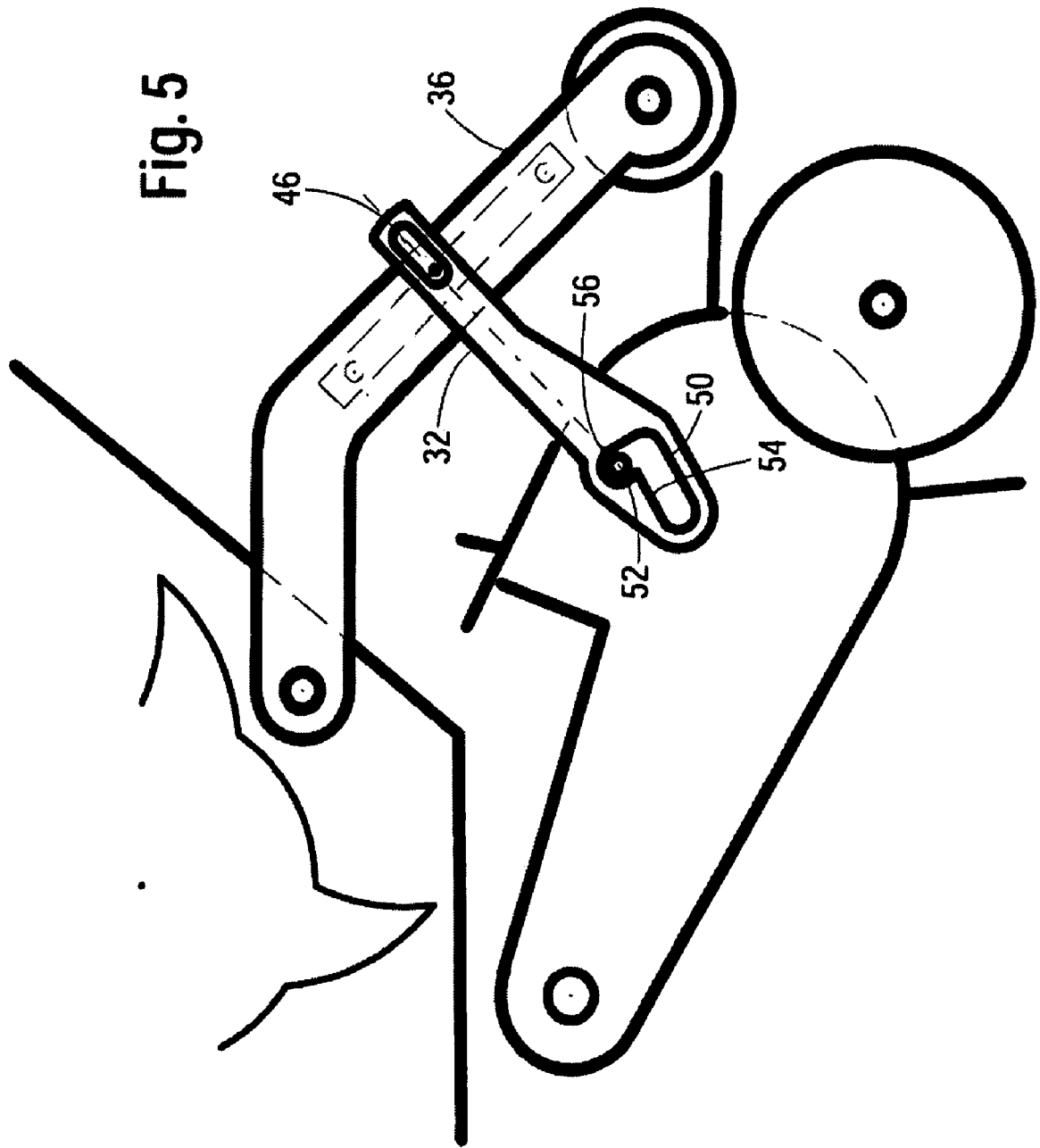
FIG. 5 shows a material hold-down device according to a third illustrative embodiment in a lower work setting of the first range of movement.
Figure 6:
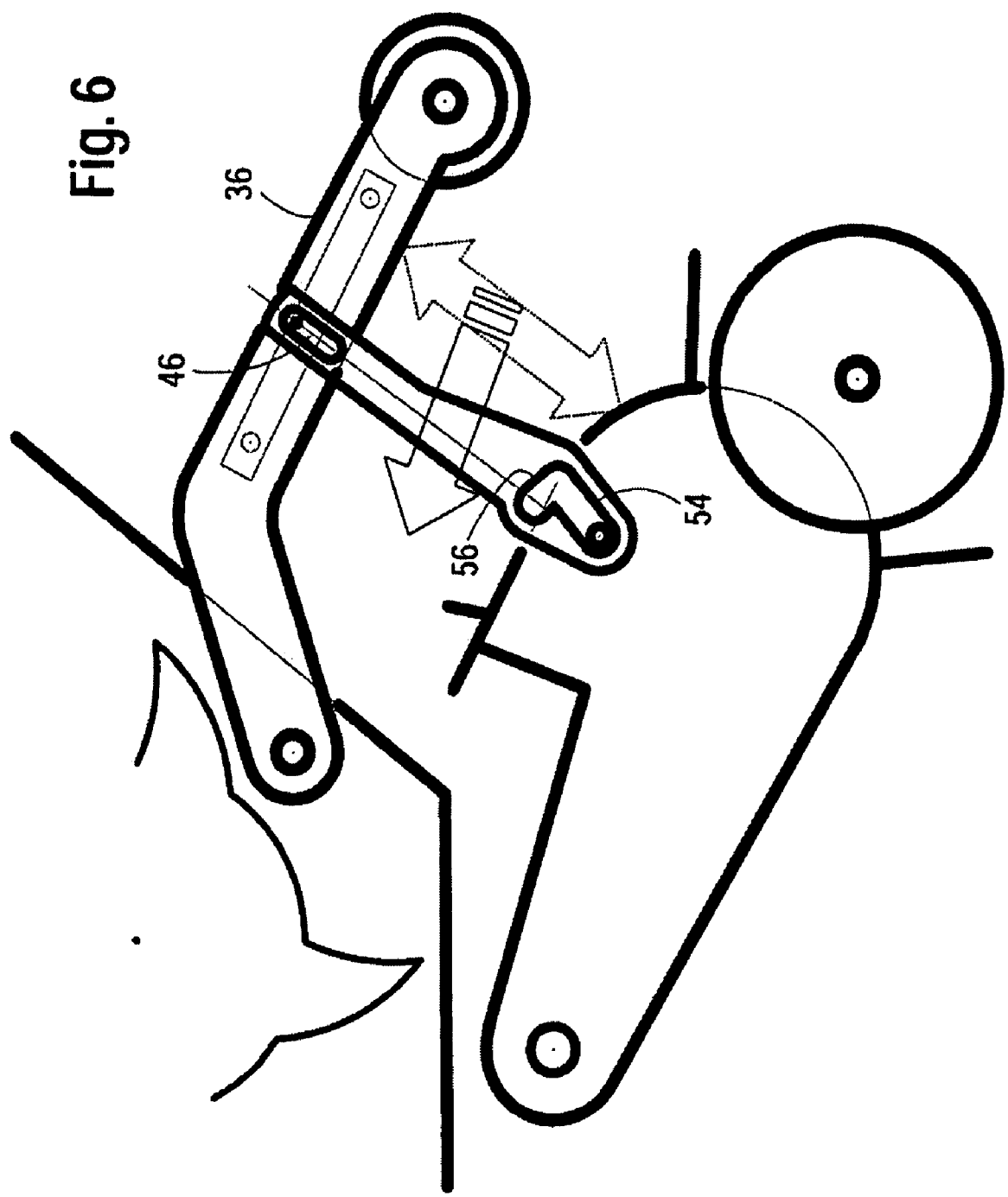
FIG. 6 shows the material hold-down device according to FIG. 5 in an upper setting of the upper range of movement, in which a material jam can be cleared.

In the illustrative embodiment according to FIGS. 5 and 6, the travel limiter 32 is provided not only with a longitudinal slot 46, forming the first region 64, on the end region facing the material-guiding device 30, but also with a hook guide 50, configured as a slot, on the opposite end region, which hook guide is penetrated by a holder 52 fastened to the material receiver 20. The hook guide 50 has a first guide portion 54, the longitudinal axis of which runs at a slight angle relative to that of the longitudinal slot 46 and which is roughly equally long. Adjoining the upper end region of the first guide portion 54 at right angles, likewise in the form of a slot, is a second guide portion 56, which can be of shorter configuration. The travel limiter 32 is arranged such that its upper end region is located in the horizontal direction before the lower end region, which means that the travel limiter 32 constantly has the tendency to swing counterclockwise in a direction to bring the guide portion 54 into a vertical alignment with the longitudinal slot 46 as the arms 36 pivot upwardly within the limits of the slot 46, which defines the normal first range of movement of the material-guiding device 30. The second guide portion 56 extends in the direction of the possible pendulum movement, to be precise on the upper side, and receives in a normal setting the holder 52. Hence, the material-guiding device 30, in normal operation, cannot move further away from the material receiver 20 than is allowed by the upper longitudinal slot 46. As soon as a jam situation has arisen, the travel limiter 32 is pivoted rearwards by its lower end region by manual or power-operated means, so that the holder 52 makes its way out of the second guide portion 56 into the first guide portion 54 and the whole of the material hold-down device 24 can now be pivoted away from the material receiver 20 by the length of the first guide portion 54, as shown in FIG. 6. The first guide portion 54 defines, in this illustrative embodiment, the second range of movement.

Figure 7:
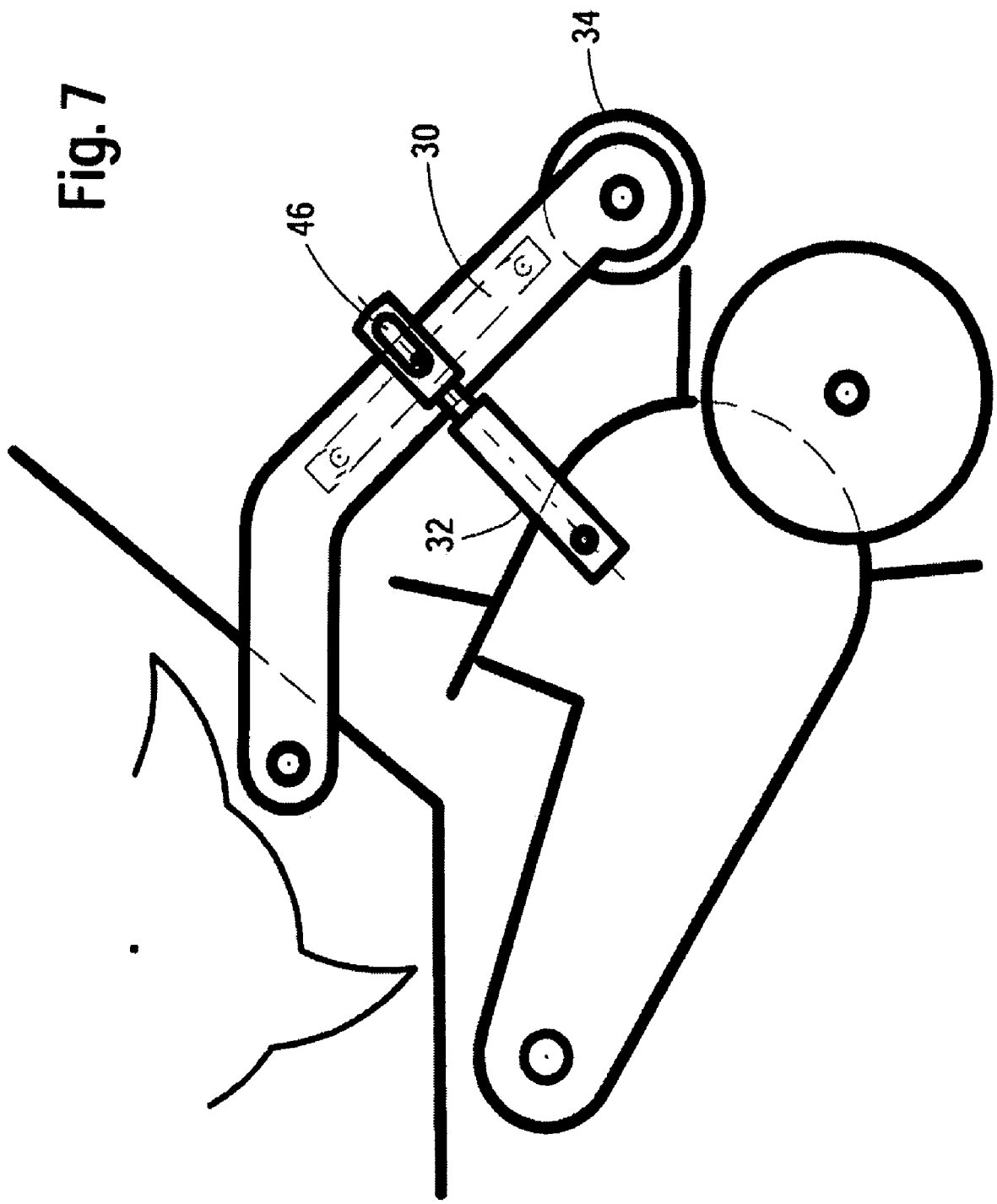
FIG. 7 shows a material hold-down device according to a fourth illustrative embodiment in a lower work setting of the first range of movement.
Figure 8:
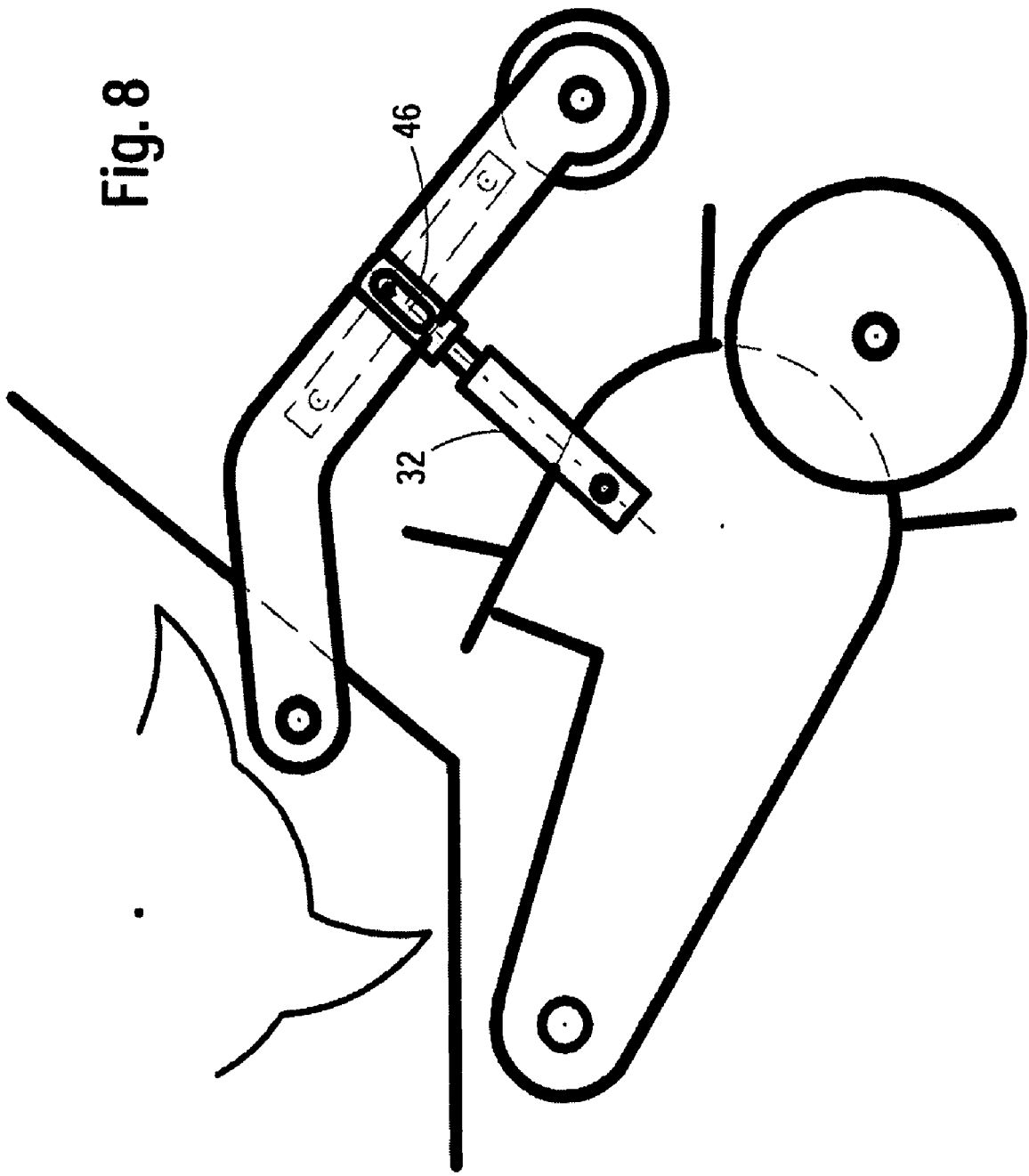
FIG. 8 shows the material hold-down device according to FIG. 7 in an upper setting of the first range of movement.
Figure 9:
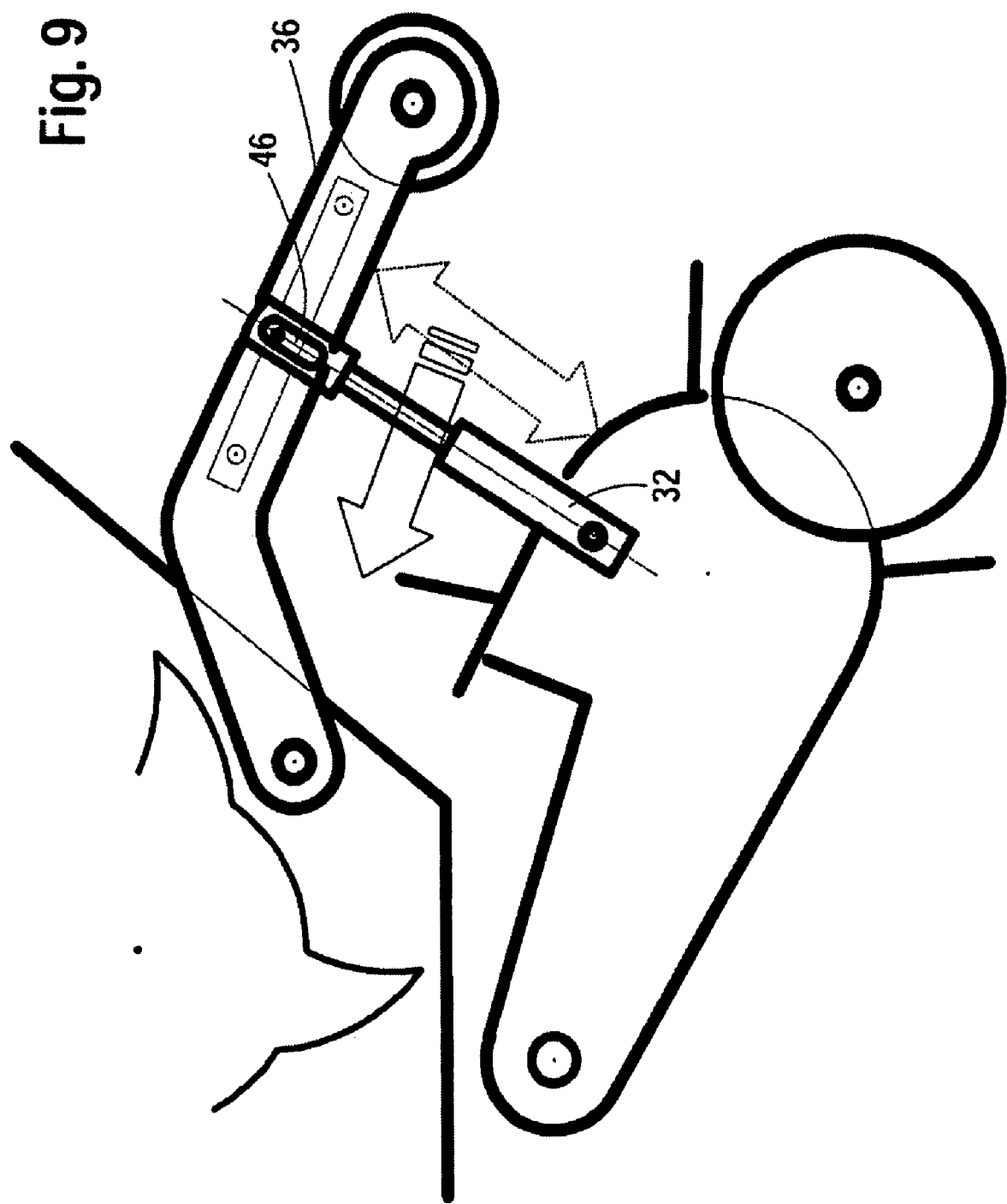
FIG. 9 shows the material hold-down device according to FIG. 7 in an upper setting of the second range of movement, in which a material jam can be cleared.

In the illustrative embodiment according to FIGS. 7 to 9, the travel limiter 32 is configured as a motor, in particular an extensible and retractable hydraulic motor, which in its upper end region has the longitudinal slot 46 contained in a strap joined to an upper end of a piston rod having a lower end joined to a piston (not shown) located within a cylinder pivotally coupled to the material receiver 20. In this case, too, the material-guiding device 30 can move vertically within the first range of movement defined by the length of the longitudinal slot 46, when the motor is fully retracted, so as to adapt to changing thicknesses of the received material stream; if a jam arises, however, the travel limiter 32 is extended and the wedged material is relieved of load. Finally, the travel limiter 32 is retracted to assume its normal length. In this case, the length of the longitudinal slot 46 corresponds once again to the first range of movement and the stroke of the travel limiter 32 configured as a motor corresponds to the second range of movement.

Figure 10:
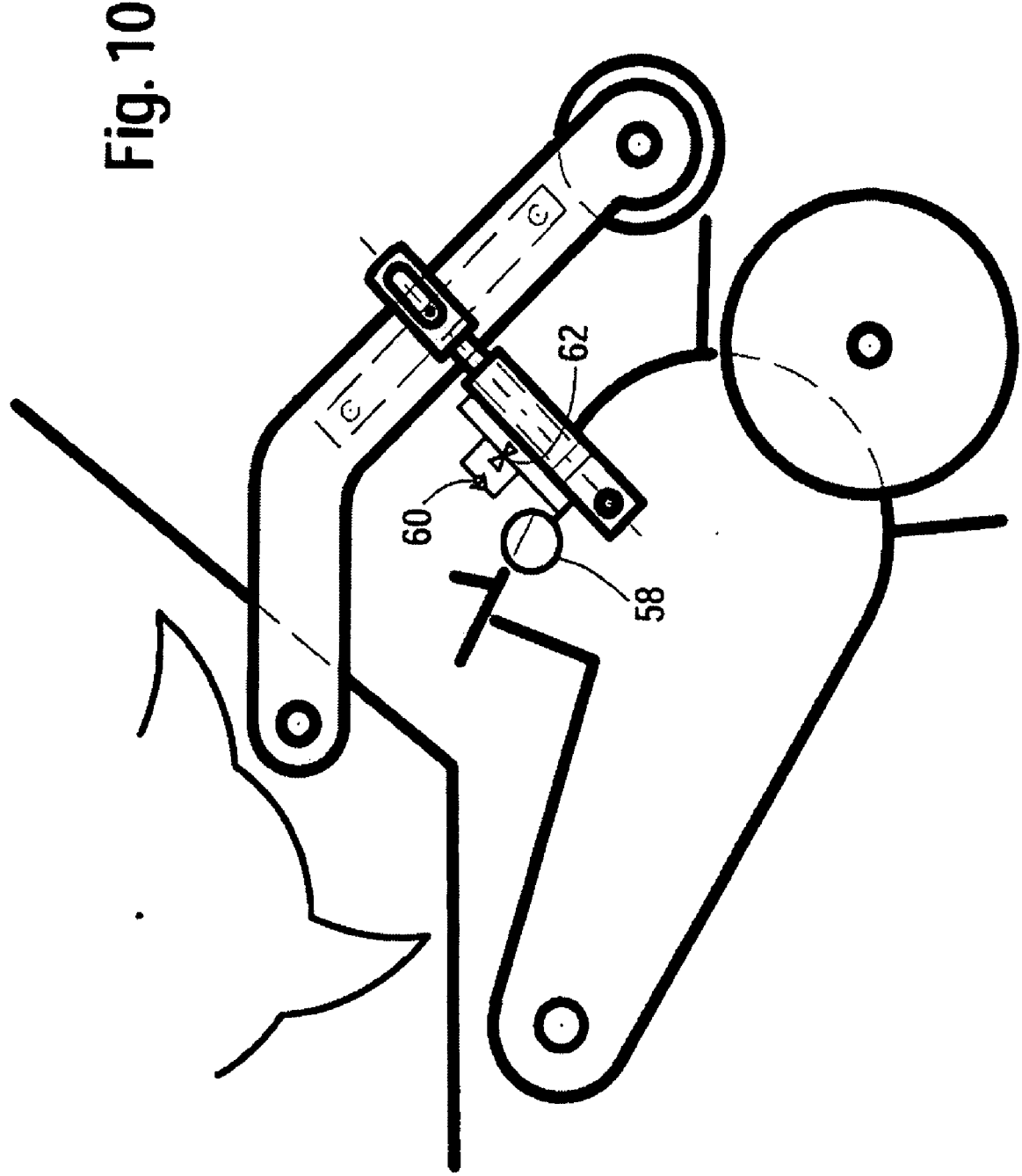
FIG. 10 shows a material hold-down device according to a fifth illustrative embodiment in a lower setting of the first range of movement.

The final illustrative embodiment according to FIG. 10 differs from that according to FIGS. 7 to 9 merely by the fact that the travel limiter 32 is not only adjustable by remote control, but can also deflect, in an overload scenario, counter to the force of a spring-loaded accumulator 58. A hydraulic circuit is configured such that the travel limiter 32 experiences no resistance upon retraction, i.e. in the direction of the material receiver 20, whilst extension in the direction of the material-guiding device 30 leads the oil stream away from the rod end of the travel limiter 32 through a non-return valve 60 via a throttle 62 to the spring-loaded accumulator 58, which thus builds up a motional resistance. The non-return valve 60 can also be opened manually or by remote control, to enable the material hold-down device 24 to be brought into the state in which the material jam can be cleared.

Having described the preferred embodiment, it will become apparent that various modifications can be made without departing from the scope of the invention as defined in the accompanying claims.

The invention claimed is:

1. In an agricultural implement including a mobile frame, a material receiver being mounted at a forward location of said frame for picking up a swath of crop material from the ground and a material hold-down device extending above said material receiver and having a rear end pivotally coupled to said frame at a location spaced above said material receiver whereby said hold-down device is mounted for vertical movement above said material receiver, with said hold-down device including a material-guiding device normally fixed relative to a remaining portion of the hold-down device and extending above said material receiver, and a travel limiting arrangement being coupled between said material receiver and said hold-down device and limiting travel of said hold-down device to a normal first range of vertical movement relative to said material receiver in response to varying thicknesses of said swath of material moving between said material receiver and said material guiding device, the improvement comprising; said travel limiting arrangement includes first and second travel limiting portions, with said first travel limiting portion being coupled between said material receiver and said hold-down device exclusive of said material-guiding device and limiting movement of said hold-down device, together with said material-guiding device, to movement within said first range of movement; and said second travel limiting portion of said travel limiting arrangement being coupled between said material guiding device and said remaining portion of said hold-down device and being configured for permitting said material-guiding device to undergo selected vertical movement within a second range of movement upwardly beyond said first range of movement in order to clear a material jam formed between said material-guiding device and said material receiver; said second portion of said travel limiting arrangement including a linkage assembly being coupled between said material-guiding device and said remaining portion of said hold-down device; and a locking device normally locking one of said linkage assembly or material guiding device to said remaining portion of said hold-down device but being selectively releasable for permitting said material-guiding device to move within said second range of movement.

2. The agricultural implement, as defined in claim 1, wherein said linkage assembly is a parallel linkage.

3. The agricultural implement, as defined in claim 1, wherein said locking device is a powered actuator.

4. The agricultural implement, as defined in claim 1, wherein said material-guiding device is configured as one of a metal plate, a rake, or as a plurality of rollers.

5. The agricultural implement, as defined in claim 1, wherein a forward end of said hold-down device is defined by a press-down device.

6. The agricultural implement, as defined in claim 5, wherein said press-down device is a roller.

* * * * *